US009715541B1

(12) United States Patent
Kosslyn et al.

(10) Patent No.: US 9,715,541 B1
(45) Date of Patent: Jul. 25, 2017

(54) IDENTIFYING CREDITS AND AGGREGATING CREDITS INTO SETS

(71) Applicant: Google Inc., Mountain View, CA (US)

(72) Inventors: David Kosslyn, San Francisco, CA (US); Eric Brandon Mayers, San Francisco, CA (US); Erica Morse, San Francisco, CA (US); Cheng Wei Lee, Mountain View, CA (US); Shrey Gupta, Mountain View, CA (US); Jung Eun Kim, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 262 days.

(21) Appl. No.: 14/547,547

(22) Filed: Nov. 19, 2014

Related U.S. Application Data

(60) Provisional application No. 62/017,765, filed on Jun. 26, 2014.

(51) Int. Cl.
*G06F 17/30* (2006.01)
*G06F 3/0482* (2013.01)
*H04L 12/18* (2006.01)

(52) U.S. Cl.
CPC ........ *G06F 17/3084* (2013.01); *G06F 3/0482* (2013.01); *H04L 12/1813* (2013.01)

(58) Field of Classification Search
None
See application file for complete search history.

(56) References Cited

U.S. PATENT DOCUMENTS

2014/0122532 A1* 5/2014 Charytoniuk .......... G06Q 50/01
707/780

OTHER PUBLICATIONS www.themoviedb.org, webpages archived on archive.org from Mar. 2013.*
Youtube Help, "Create a new channel," webpages archived on archive.org from Nov. 2013.*
www.IMDB.com, webpages archived on archive.org from Jan. 2013.*

* cited by examiner

*Primary Examiner* — Jay Morrison
(74) *Attorney, Agent, or Firm* — Lowenstein Sandler LLP

(57) ABSTRACT

A method to enhance collaboration by enabling users of a content-sharing platform to identify media items to credit the entities that contributed to the media item. Such a method includes receiving a request for a media item and obtaining credit data associated with the media item. The method further includes providing for presentation the media item and a list of entities contributing to the media item as defined by the credit data and when receiving the request pertaining to an entity from the list, providing for presentation a list of media items that the entity has contributed to.

20 Claims, 8 Drawing Sheets

(12) United States Patent
US 9,715,541 B1

IDENTIFYING CREDITS AND AGGREGATING CREDITS INTO SETS

CROSS REFERENCE TO RELATED APPLICATIONS

This application claims priority from the following U.S. provisional patent application, which is hereby incorporated by reference: Ser. No. 62/017,765, filed on Jun. 26, 2014 and entitled "IDENTIFYING CREDITS AND AGGREGATING CREDITS INTO SETS"

TECHNICAL FIELD

This disclosure relates to the field of content-sharing platforms and, in particular, to identifying and crediting user contributions to media items.

BACKGROUND

On the Internet, content-sharing platforms, like social networks and others, allow users to connect to and share information with each other. Many social networks include content-sharing aspects that allow users to upload, view, and share content, such as video content, image content, audio content, and so on (which may be referred to as "media items" or "content items"). Such media items may include professionally produced audio clips, movie clips, TV clips and music videos, as well as amateur content such as video blogging, short original videos, pictures, photos, audio recordings, other multimedia content, etc. Users may use computing devices (such as smartphones, cellular phones, laptop computers, desktop computers, netbooks, and tablet computers) to access the content-sharing platforms to use, play, and/or consume media items (e.g., watch digital videos, and/or listen to digital music).

As the volume of content available on a content-sharing platform increases, it may become increasingly difficult for a particular user to find content that most interests that user. Content-sharing platforms often include features that allow users to follow or subscribe to a specific contributor in order to be automatically notified when the contributor uploads new content. However, this feature may not automatically notify the user when a media item including the contributor is uploaded by a different user. In addition, a user may find it challenging to identify the contributors they are interested in, especially if the contributor is behind the scenes.

SUMMARY

The following is a simplified summary of the disclosure in order to provide a basic understanding of some aspects of the disclosure. This summary is not an extensive overview of the disclosure. It is intended to neither identify key or critical elements of the disclosure nor delineate any scope of the particular embodiments of the disclosure or any scope of the claims. Its sole purpose is to present some concepts of the disclosure in a simplified form as a prelude to the more detailed description that is presented later.

In one implementation, a method is disclosed for enhancing collaboration by associating media items with credit data to identify entities that contribute to the media item. Such a method includes receiving a request for a media item and obtaining credit data associated with the media item. The method further includes providing for presentation the media item and a list of entities contributing to the media item as defined by the credit data and when receiving the request pertaining to an entity from the list, providing for presentation a list of media items that the entity has contributed to. Other associated systems and methods are also provided.

In another implementation, a system facilitates displaying entities that contributed to the content of a media item. The system includes memory for storing instructions and a processing device coupled to the memory. The processing device executes the instructions to receive a request for a media item and to obtain the credit data associated with the media item. The system further includes instructions to provide for presentation the media item and a list of entities contributing to the media item as defined by the credit data and when receiving the request pertaining to an entity from the list, provide for presentation a list of media items that the entity has contributed to.

In additional implementations or embodiments, computing devices for performing the operations of the above-described implementations are also disclosed. Additionally, in some implementations of the disclosure, a non-transitory computer-readable storage medium stores instructions for performing the operations of the above described implementations.

BRIEF DESCRIPTION OF THE DRAWINGS

The present disclosure is illustrated by way of example, and not by way of limitation, in the figures of the accompanying drawings.

These drawings may be better understood when observed in connection with the following Detailed Description.

DETAILED DESCRIPTION

Implementations are described for facilitating collaboration by allowing users of a content-sharing platform to associate media items (e.g., videos) with credit data that identifies the entities (e.g., users) that contributed to the media item. The credit data may include metadata identifying a media item, an entity and may also include the role the entity had (e.g., actor, director, writer, generic collaborator) in the creation of the media item. The metadata of the credits may also include, for example, whether the entity is on-screen (e.g., actor) or off-screen (e.g., makeup artist), or whether the entity contributed financing to the project. Each entity identified in a media item may receive a notification indicating the entity was identified in credit data and allowing the entity to verify the credit data is accurate. The entity may accept, reject or report the credit data as spam.

The implementations of the present disclosure may allow the entities identified by the credit data to explicitly share with their followers or subscribers. The entity may also add the media item to their own media libraries to be featured alongside their own uploads, even though it was uploaded by another entity. When entities add the media item to their library, they may choose to feature it on their profile page. Each time they add a new media item to their library, it may automatically update the entity's profile. The entity may configure the content sharing system to feature all media items that include credit data identifying the entity (e.g., all collaborations), or only those collaborations with specific properties, for example, collaborations in which the entity had role Y or collaborations with entity X.

The content sharing system may display the credit data and corresponding metadata in the form of credits underneath the media item. Users may view the credit data and select a specific entity identified in the credit data (e.g., click-on) to navigate to the entity's profile. The user may also be able to search the credit data in various ways. For example, a user may search for entities that have had a specific role (e.g., lighting designer) and view the media items contributed by that entity. In addition, the users may also follow or subscribe to these set of collaborations, to show up in their feeds.

Frequently in this disclosure, examples directed to user-uploaded videos are presented. This is done for ease of explanation of some of the features described herein. However, embodiments with other content are also within the scope of this disclosure, regardless of whether specific examples of such are provided herein.

Figure 1:
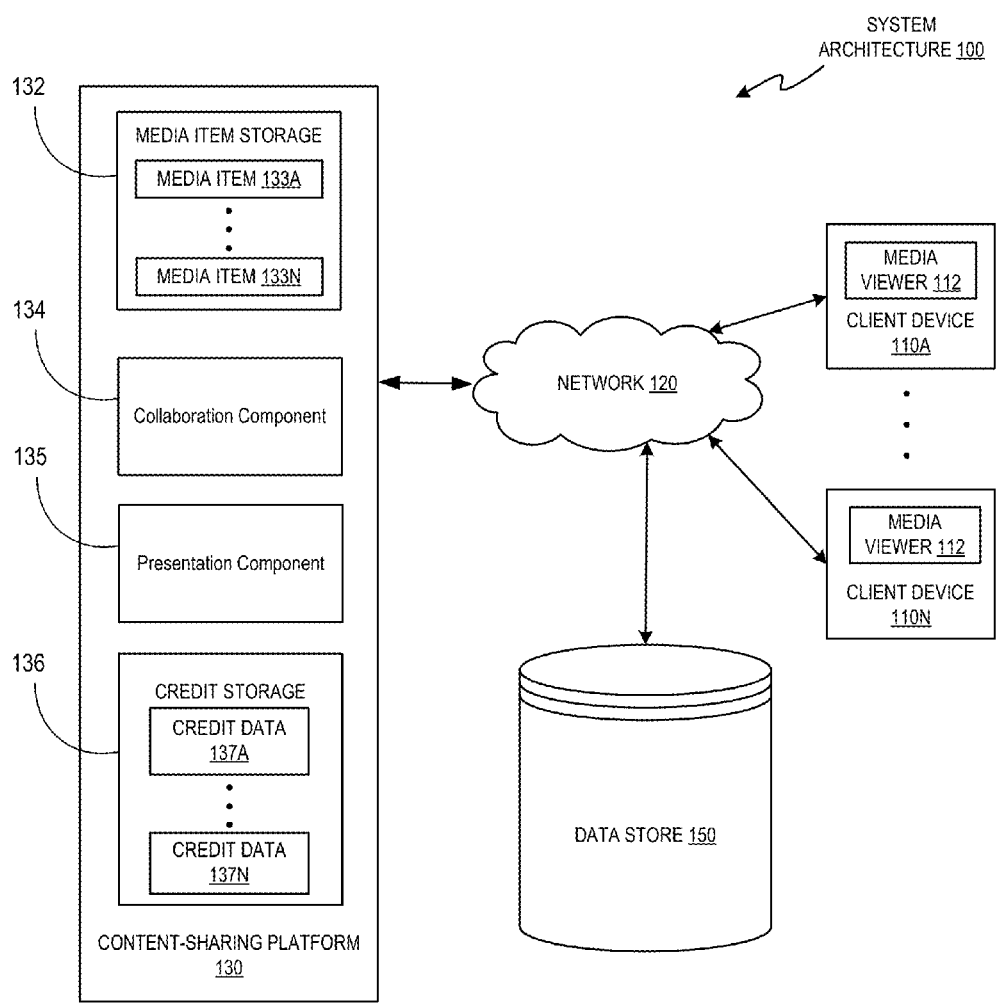
FIG. 1 illustrates an exemplary system architecture, in accordance with an embodiment of the disclosure.

FIG. 1 illustrates an exemplary system architecture 100 for distribution and displaying of media items, in accordance with an embodiment of the disclosure. The system architecture 100 includes a plurality of client devices 110A through 110N, a network 120, a content-sharing platform 130, and a data store 150. In one embodiment, network 120 may be a public network (e.g., the Internet), a private network (e.g., a local area network (LAN) or wide area network (WAN)), a wired network (e.g., Ethernet network), a wireless network (e.g., an 802.11 network or a Wi-Fi network), or a cellular network (e.g., a Long Term Evolution (LTE) network), having routers, hubs, switches, servers, and/or a combination thereof. In one embodiment, the data store 150 may include a memory (e.g., random access memory), a cache, a drive (e.g., a hard drive), a flash drive, a database system, a storage area network (SAN), or another type of component or device capable of storing data. The data store 150 may also include multiple storage components (e.g., multiple drives or multiple databases) that may also span multiple computing devices (e.g., multiple server computers) and storage devices such as may be present in a data center.

The client devices 110A-N may each include computing devices such as personal computers (PCs), laptops, mobile phones, smartphones, tablet computers, wearable computing devices, etc. Client devices 110A-N may be used to consume (e.g., view, hear, etc.) and upload content to the content-sharing platform 130. In some embodiments, client device 110A-N may also be referred to as "user devices." Each client device includes a media viewer 112. In one embodiment, the media viewers 112 may be applications that allow users to receive visible content, such as images, videos, web pages, documents, etc., and audio content such as live audio and sound recordings. For example, the media viewer 112 may be a web browser that can access, retrieve, present, and/or navigate content (e.g., web pages such as Hyper Text Markup Language (HTML) pages, digital media items, etc.) served by a web server. The media viewer 112 may render, display, and/or present the content (e.g., a web page, a media viewer) to a user of a client device. The media viewer 112 may also display an embedded media player (e.g., a Flash® player or an HTML5 player) that is embedded in a web page (e.g., a web page that may provide information about a product sold by an online merchant, a content-sharing platform such as a social network). In another example, the media viewer 112 may be a standalone application, such as smartphone application, that allows users to view digital media items (e.g., digital videos, digital images, electronic books, shared text, etc.) as part of the content-sharing platform 130.

The media viewers 112 may be provided to the client devices 110A-N by the content-sharing platform 130 and/or a third-party distribution platform. For example, the media viewers 112 may be embedded media players that are embedded in web pages provided by the content-sharing platform 130. In another example, the media viewers 112 may be applications that are downloaded from a server accessible to the client devices 110A-N through the network 120.

In general, functions described in one embodiment as being performed by the content-sharing platform 130 can also be performed on the client devices 110A-N in other embodiments if appropriate. In addition, the functionality attributed to a particular component can be performed by different or multiple components operating together. The content-sharing platform 130 can also be accessed as a service provided to other systems or devices through appropriate application programming interfaces (APIs), and thus is not limited to use in websites.

In some embodiments, the content-sharing platform 130 includes one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content-sharing platform 130 may allow a user to consume, upload, search for, approve of ("like"), dislike, share, and/or comment on media items. The content-sharing platform 130 may also include a website (e.g., a web page) and/or a smartphone application that may be used to provide a user with access to the media items.

The content-sharing platform 130 may include a media item storage 132 that includes a plurality of media items 133A-N. Examples of media items 133A-N can include, and are not limited to, digital video, digital movies, digital photos, digital music, website content, social media updates, electronic books (ebooks), electronic magazines, digital newspapers, digital audio books, electronic journals, blogs, real simple syndication (RSS) feeds, electronic comic books, software applications, etc. Many other kinds of metadata may be included in the media item storage 132, such as a type of each media item, a creation or uploading date and time of each media, consumption history identifying one or more users of the content-sharing platform 130 that have consumed media item, etc. Every media item having a metadata entry including metadata stored in the metadata database 138 may not have every kind of metadata stored in association with it.

In some examples, media items 133A-N may be consumed (e.g., viewed and/or heard) via the Internet and/or via a mobile device application. As used herein, "media," media item," "online media item," "digital media," "digital media item," "content," and "content item" can include and refer to an electronic file that can be executed, loaded, or played using software, firmware, or hardware configured to present the digital media item to a viewing user of the content-sharing platform 130.

The content-sharing platform 130 may include entity data. Examples of entities can include, and are not limited to: individual users, groups of users, corporations or other business association.

The content-sharing platform 130 may also include credit data storage 136 that includes credit data 137A-N. Each credit data 137A-N may represent an entity and include metadata identifying the entity's contribution to the creation, publication, or promotion of a media item. The metadata may identify the entity as having a role in the media item as, for example, an actor, a producer, a director or writer. The metadata may also include contributors that provided financing for the media item or that performed editing tasks. The metadata may also include information that groups or categorizes the entity's contribution, for example, into on-stage and off stage contributions. On stage contributions, may include actors whereas off stage roles may include, for example, lighting designers and costume designers. The following are examples of contribution roles, casting director, music composer, production designer, set designer, costume designer, make-up artist, visual effects director, editor, director of photography, producer, co-producer, executive producer, studio, or production company.

In some embodiments, when a user uploads a media item to the content-sharing platform 130, that user may identify or "credit" one or more entities pertaining to the media item, thereby associating one or more credits with that media item in metadata accessible to platform 130. The credit data may collectively function to identify credits of a media item, as would traditionally be seen following a film.

According to some aspects of the disclosure, associations between media items and respective credit data are stored in credit storage 136. Alternatively or in addition, metadata of each media item may include identifiers of respective entities or credits.

The content-sharing platform 130 may include a collaboration component 134 to facilitate creation, update and verification of credit data, and a presentation component 135 to facilitate presentation of contributors for a specific media item and/or presentation of media item credits of a specific entity (e.g., media items that a specific entity has contributed to). Alternatively, the collaboration component 134 and/or the presentation component 135 can be part of a different system and/or hosted by a different machine.

Figure 2:
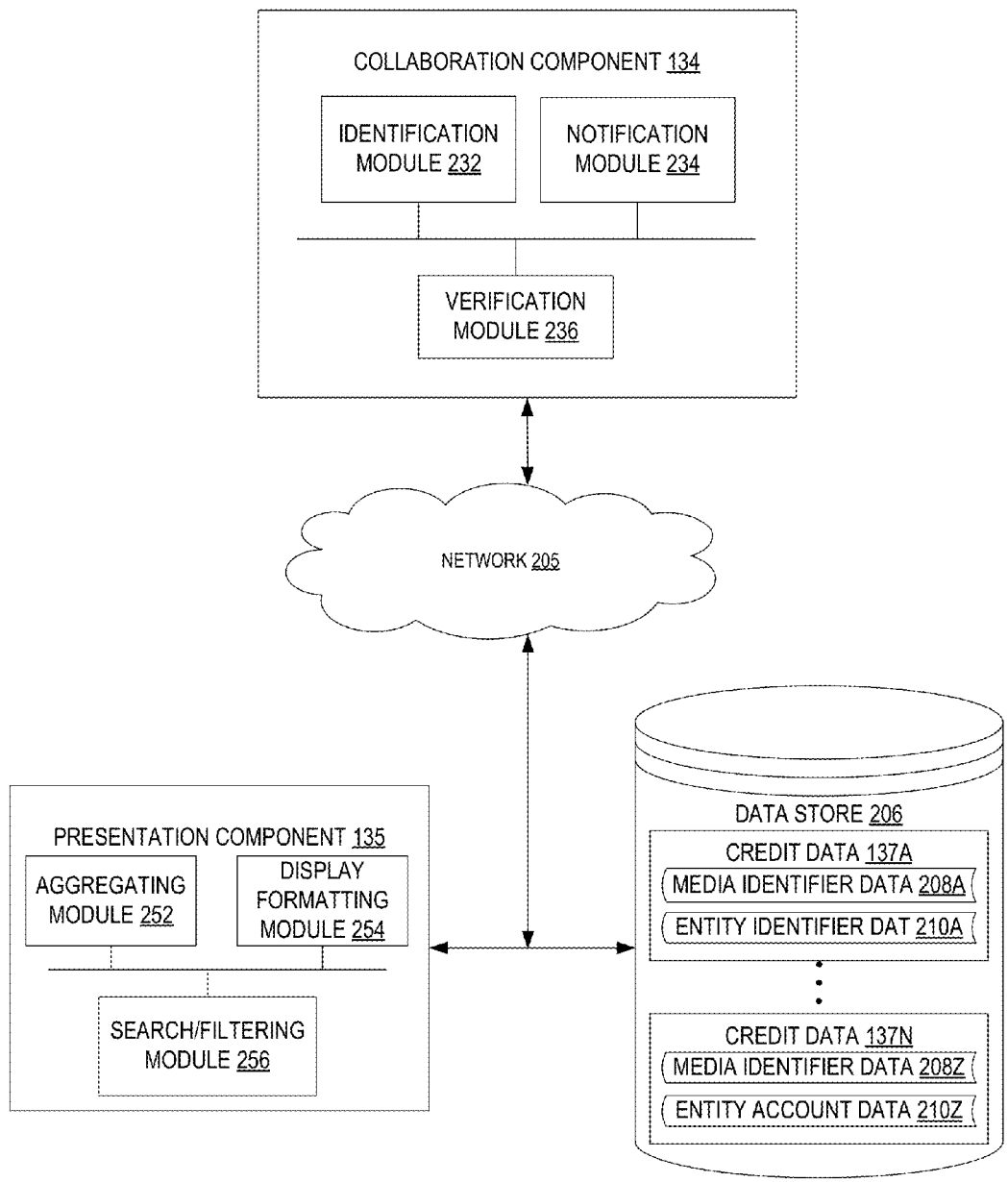
FIG. 2 is a block diagram illustrating a collaboration component and presentation component in accordance with embodiments of the disclosure.

FIG. 2 is a block diagram illustrating the collaboration component 134 and presentation component 135 in accordance with embodiments of the disclosure. Collaboration component 230 and presentation component 135 may be communicably coupled through network 205. Network 205 may be similar to network 120 and may, for example, be a network within a datacenter. Alternatively, collaboration component 230 and presentation component 135 may execute on the same machine or on different interconnected machines, for example, separate machines within a datacenter. The collaboration component 134 includes an identification module 232, notification module 234 and verification module 236. Identification module 232 may form credit data entries based on information received from a user. The identification module interacts with notification module 234 to alert or notify an entity that has been identified. The notification or alert may comprise an in-product notification via icon or textual message. This may include a modification to a mobile application to include for example, a different icon or an icon modified with an overlay. In another example, the notification may also be disseminated separate from a web or mobile application for example through email, SMS or instant message.

Verification module 236 may be communicably coupled with notification module 234 and may allow an entity to verify or confirm the existence and/or content of the credit data. The verification module 236 may be configurable by an administrator and/or user to function in separate modes, for example, a consent mode or a reject mode. The consent mode may require an entity to expressly approve the credit data and/or the credit's metadata before the credit data takes effect. As such, after credit data creation the verification module may present a user with a choice to either accept or deny the credit data. The reject mode may allow the credit data to take effect upon its creation or at some predetermined duration of time after its creation (e.g., an hour, a day, a week). In the latter mode, the credit data may be ignored in which case it may be automatically verified or impliedly verified without the entity's express verification of the credit data and/or its content. As such, if the user ignores the notification the credit data will still take effect. The entity may choose to revoke the credit data which will make the credit data ineffective.

In another example, the entity identified may be able to modify the content of the credit data to correct it prior to verification. For example, if the credit data's metadata indicated the entity performed the lighting when in fact the entity handled the audio the entity may update the content. At that point, the credit data may be considered verified, however it may have to go back to the original user that initiated the credit data for subsequent approval before taking effect.

The presentation component 135 includes aggregating module 252, display formatting module 254 and search and filtering module 256. Aggregating module 252 may be capable of analyzing credit data 137A-N stored in data store 206. Aggregating module 252 may accumulate the credit data associated with a specific media item or a specific entity. When a media item is selected, aggregating module 252 may locate all of the credit data associated with that specific media item and accumulate the media items identified within the credit data. When an entity is selected, aggregating module 252 may locate all of the credit data associated with that specific entity and accumulate the media items identified within the credit data.

Display Formatting module 254 may format the credit data into credits (e.g., credit lists, credit sets or credit arrangements). The credits may be media item credits, which are the credits for a specific media item and may comprise multiple entities that contributed to the creation, publication or promotion of the media item as identified in the credit metadata. The media item credits may appear similar to the format of opening credits or closing credits of a motion picture or television program. In one example, the format of the credits may follow a screenwriting credit format, such as, one determined by the writers Guild of America, East (WGAE) or the Writers Guild of America, West (WGAW).

The credits may also be entity credits, which are credits for a specific entity and may comprise multiple media items the entity has contributed to. The entity credits may appear similar to a resume format and list multiple media items along with the role the entity fulfilled in contributing to the media item.

Search and Filtering Module 256 may be communicable coupled with display formatting module 254 and aggregating module 252 and may allow the user to search or filter credit information. For example, a user may choose to execute a search for the media items in which the entity had a specific role (e.g., actor, sound track, make-up). In another example, the user may search for media items that have a user specified combination of entities that function in selected roles, such as, searching for media items that have Tom Hanks and Meg Ryan as credited actors. The module may then filter what is currently being displayed in the entity credits to only display the search results.

Module 256 may also search collaborator data and ranking across the content sharing platform 130 to promote content to viewers who like that contributor. The collaborator data may include shared audiences, complementary skills, similar performance levels, or shared past collaborators, among others.

In situations in which the systems discussed here collect personal information about users, or make use of personal information, the users may be provided with an opportunity to control whether the content-sharing platform 130 collects user information (e.g., information about a user's social network, social actions or activities, profession, a user's preferences, a user's current location, or a user's consumption history), or to control whether and/or how to receive content from the content-sharing platform 130 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content-sharing platform 130.

Figure 3A:
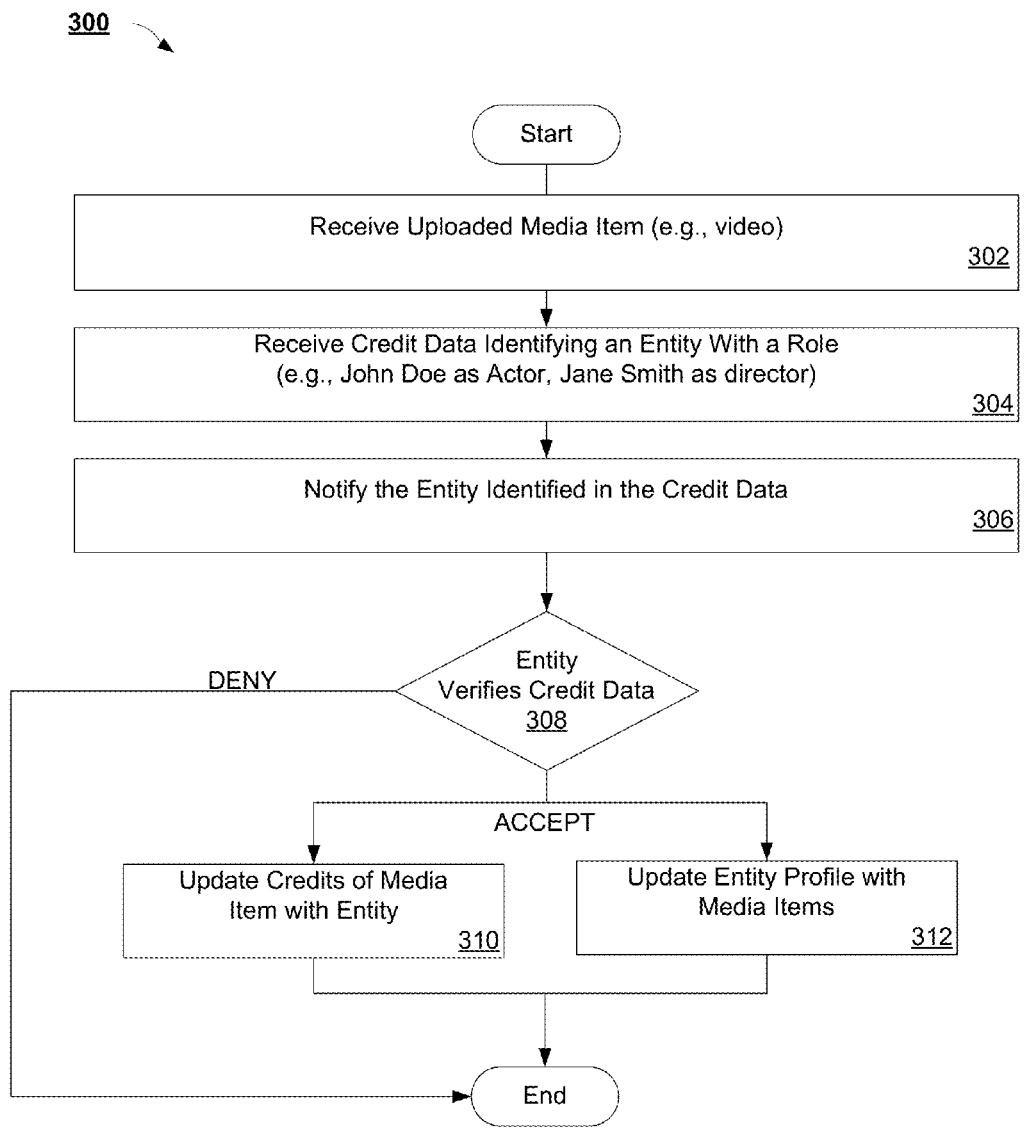
FIG. 3A is a flow diagram illustrating a method of associating a media item with credit data that identifies entities that contributed to the media item according to some embodiments of the disclosure.

FIG. 3A is a flow diagram illustrating a method 300 for identifying entities that contribute to a media item and verifying that the contributions are correctly recorded. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the method 300 and other methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any non-transitory, tangible computer-readable device or storage medium. In one embodiment, method 300 may be performed by a collaboration component (e.g., collaboration component 134 shown in FIGS. 1 and 2).

Embodiments of the method 300 may begin at block 302 when the processing logic receives an uploaded media item (e.g., video). The media item may be uploaded by a user of the content-sharing platform 130 in an effort to attract viewers to the users channel. At block 304 the processing logic may receive credit data crediting an entity with a role. For example, entity John Doe may be identified in a video for his role as an actor and John Smith may also be identified in the same video as a director. Each credit may include metadata that identifies an entity, a media item and the role that the entity fulfilled to contributed to the media item. At block 306 the processing logic may notify the entity identified in the credit data utilizing notification module 134 The notification or alert may comprise an in-product notification via icon or textual message. The notification may also or alternatively be disseminated separate from the web or mobile application for example through email, SMS or instant message.

At block 308, the processing logic may require the entity identified in the credit data to verify that the credit data and/or its metadata accurately reflect the contribution of the entity. The entity may choose to "accept" the credit data or "deny" the credit data. If the credit data is denied the credit data is ineffective and the processing logic will discontinue processing the credit data. If the entity chooses to accept the credit data, the credit data is considered "verified credit data" and will be considered a validated credit.

At block 310, the processing logic may update the media item in view of the verified credit data (e.g., verified credits). This may involve updating the credits of the media item with the entity identified in the metadata of the media item and/or as a new association(s) between the media item and the verified credit data in a data store. Subsequently, when the media item is presented to the user, the updated information may be used to generate an up-to-date credit list. For example, if the verified credit data included metadata identifying the entity as a director, the presented credits may include a director field that is populated with the entity name. In addition or alternatively, if the user continues viewing the media item as credit data is being verified and added, the verified credit data may appear in the updated credit list next to the media item being viewed.

At block 312, the processing logic may update an entity profile with the identified media item. An entity profile may include details about the entity, for example, the entity's name and a list of uploaded media items. Updating the entity profile may comprise adding the media item to a list of media items the user has contributed to. In some examples, the uploaded media items and contributed media item may be included in a single list, which may be presented to viewers on the entity's profile.

Figure 3B:
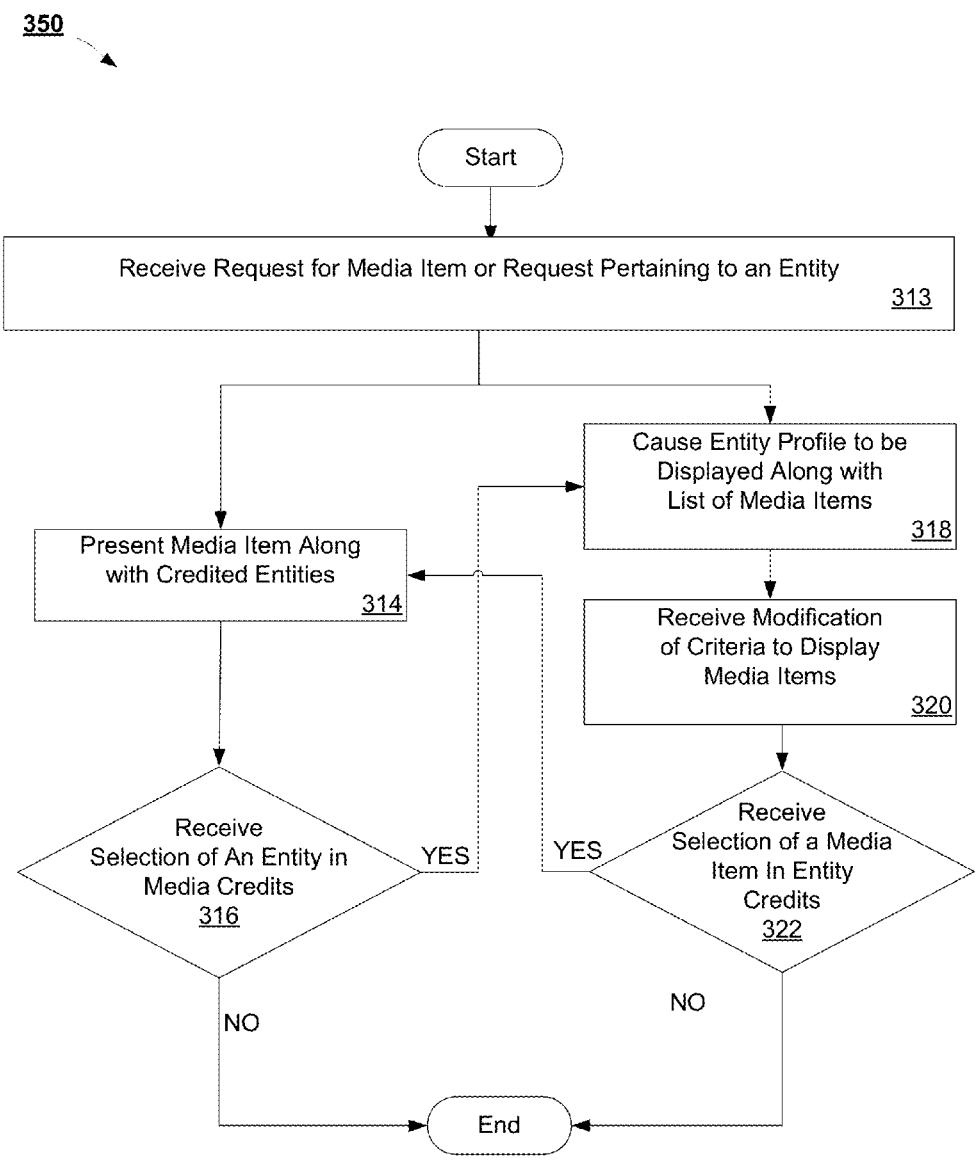
FIG. 3B is a flow diagram illustrating a method of displaying credit data according to some embodiments of the disclosure.

FIG. 3B is a flow diagram illustrating a method 350 for displaying the credit data with the media items and entity profiles. The method 350 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 350 may be performed by a presentation component (e.g., presentation component 135 shown in FIGS. 1 and 2). Alternatively, method 350 may be performed by media viewer 112 shown in FIG. 1.

At block 313, the processing logic may receive a request for a media item or a request pertaining to an entity. These requests may be submitted by a user. If the request is for a media item the method may proceed to step 314, whereas if the request is for an entity the method may proceed to step 318.

At block 314, the request may be for a media item and the processing logic may cause the media item to be presented along with the identified entities. In some implementations, the identified entities and associated metadata may be aggregated and formatted by the content sharing platform into credits and sent to the user device. The user device (e.g., media viewer app) may then present these credits similar to the format of opening credits or closing credits of a motion picture or television program. In one example, the format of the credits may follow a screenwriting credit format, such as, one determined by the writers Guild of America, East (WGAE) or the Writers Guild of America, West (WGAW).

At block 316, the processing logic may receive a user selection of an entity displayed in the credits. One or more of the entities displayed in the credits may be linked to the respective entity's profile so that a viewing user can select the link to navigate to the profile of the entity.

At block 318, the processing logic may cause the entity profile to be displayed along with a list of media items. The list of media items may include media items uploaded by the user as well as media items uploaded by others but associated with the entity by credit data.

At block 320, the processing logic may receive a user's input to modify the criteria for displaying media items (e.g., list only the media items where entity is the director). At block 322, the processing logic may receive user selection of a media item being displayed in the credits portion of the entity profile. This media credit may be linked to the media item display discussed at block 316. As such, when a user selects the media item, it may navigate to the media item display.

Figure 4:
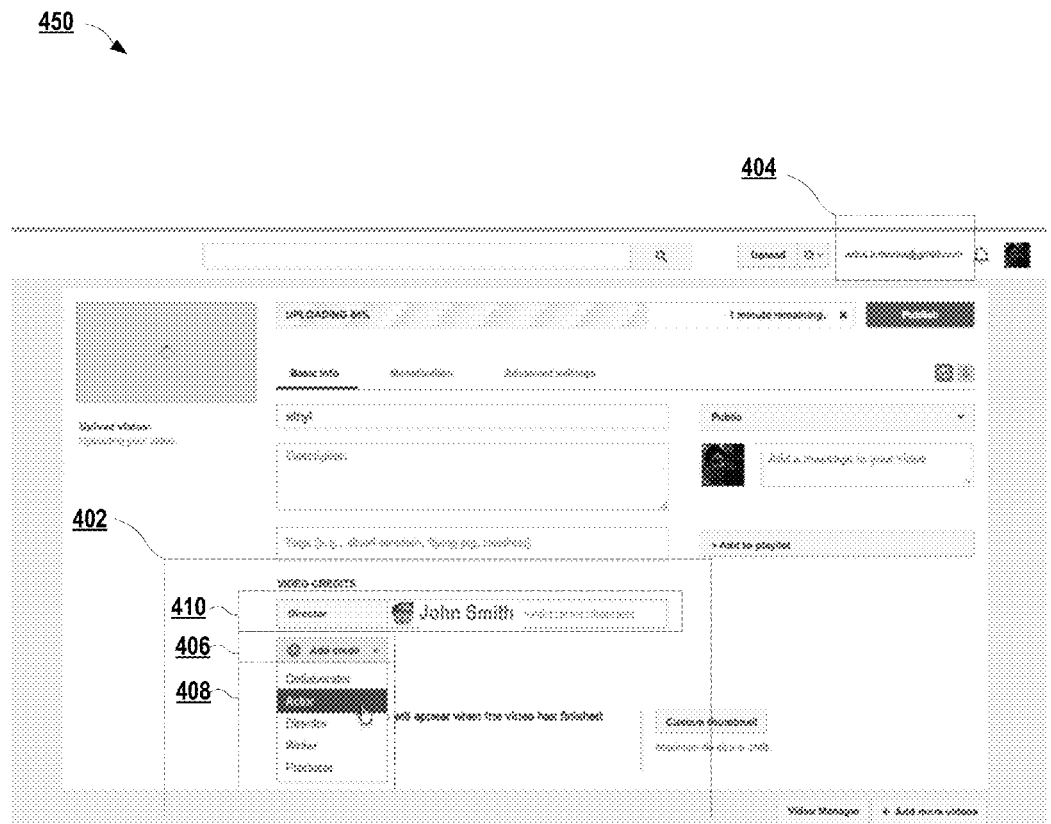
FIG. 4 illustrates an example user interface (UI) 450 for facilitating the upload of media items and for identifying entities that contributed to the media item, in accordance with some aspects of the present disclosure.

FIG. 4 illustrates an example user interface (UI) 450 for facilitating the upload of media items and for identifying entities that have contributed to the media item, in accordance with some aspects of the present disclosure. Interface 450 includes credit area 402, added entity area 410, credit button 406 and role list box 408. Added entity area 410 may display the current user. This user may utilize features of interface 450 to upload and identify media items. The user may then select credit button 406 to add credit data to the media item. Interface 402 may then present the user with role list box 408 for the selection of a role that most closely resembles the entity's contribution to the media item. Upon selection of the role, the interface may populate the metadata of the credit data with information relating to the entity and role and generate credit data. The credit data may be displayed as, for example, credit 410. Credit 410 displays entity "John Smith" as "director."

As shown above, the user identifying the contributors may be the same user that uploaded the media item. In other examples, the user may be different. For example, an entity that contributed to the media item but did not upload the content may utilize an interface similar to interface 450 to identify itself in the media item. In another example, any user of the content-sharing platform may identify any entity using an interface similar to interface 450. In yet another example, the content sharing platform 130 may include a module that can automatically identify a contributor. For example, the content sharing platform 130 may utilize matching technology to detect that a portion of the media item (e.g., sound track) matches an audio recording of a band and thus it may identify the media item with the band.

Figure 5:
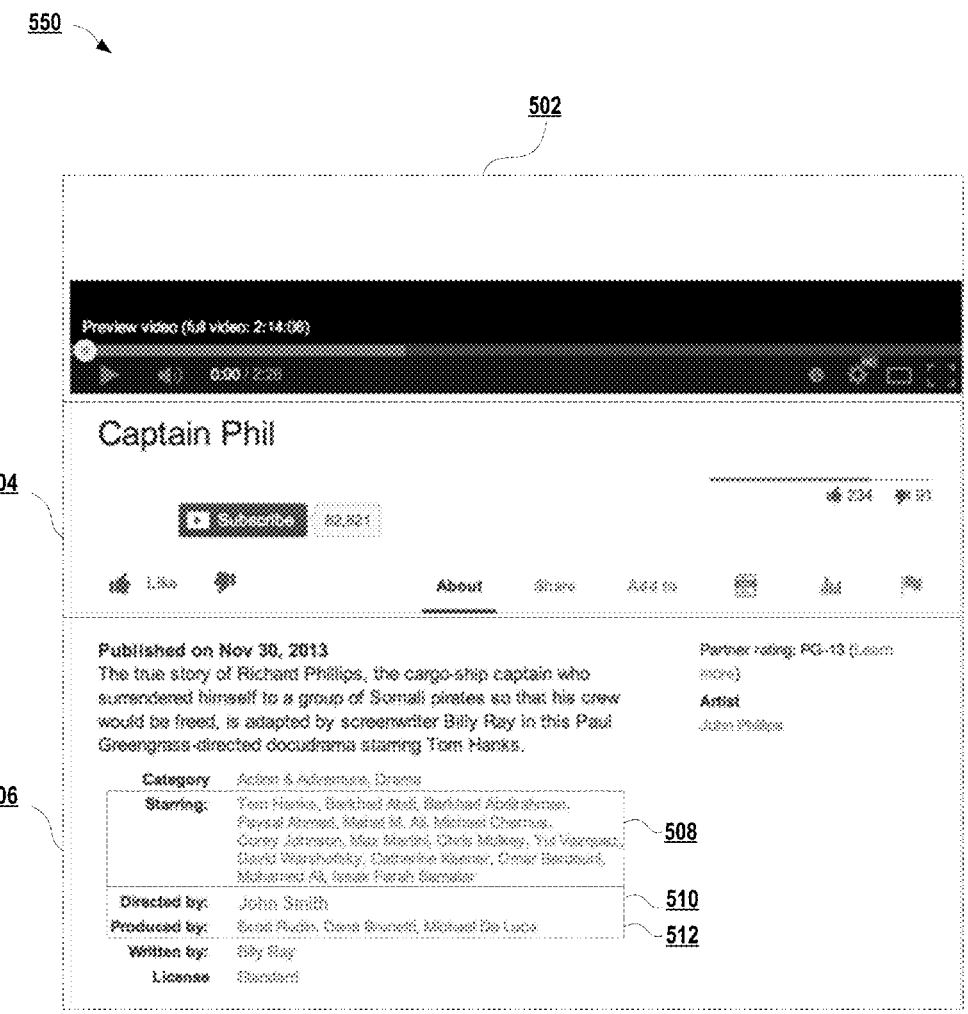
FIG. 5 illustrates an example user interface (UI) 550 for displaying a media item along with the entities that contributed to the creation of the media item, in accordance with some aspects of the present disclosure.

FIG. 5 illustrates an example user interface (UI) 550 for displaying a media item along with one or more entities that contributed to the creation of the media item. Interface 550 includes media item area 502, media details area 504 and credits area 506. Media item area 502 may comprise a portion of the display for viewing the media item, for example a media player area in the upper portion of interface 550. Media details area 504 may be placed below media item area 502 and may display a title, description and publication date of the media item.

Interface 550 may also include credits area 506, which may include multiple areas, such as a starring area 508, a produced by area 510, a written by area 512 and a license area 514. Each area may correlate to one or more types of metadata stored in the credit data. For example, starring area 508 may include entities identified with the role of actor or actress. Whereas, directed by area 510 and produced by area 512 are populated based on metadata of director and producer respectively.

One or more of the entities listed in a given area may function as a link to (e.g. be selectable user interface elements to link to) the entity's profile. By selecting a given entity, the viewer may be able to view that entity's profile to view information about that entity. Not every entity listed within an area needs to be associated with credit data and thus not every entity will be linked to a profile. For example, some of the names listed in the credits may be derived by inserting a text string within a description of the media item as opposed to identifying an entity registered with the content-sharing platform.

Figure 6:
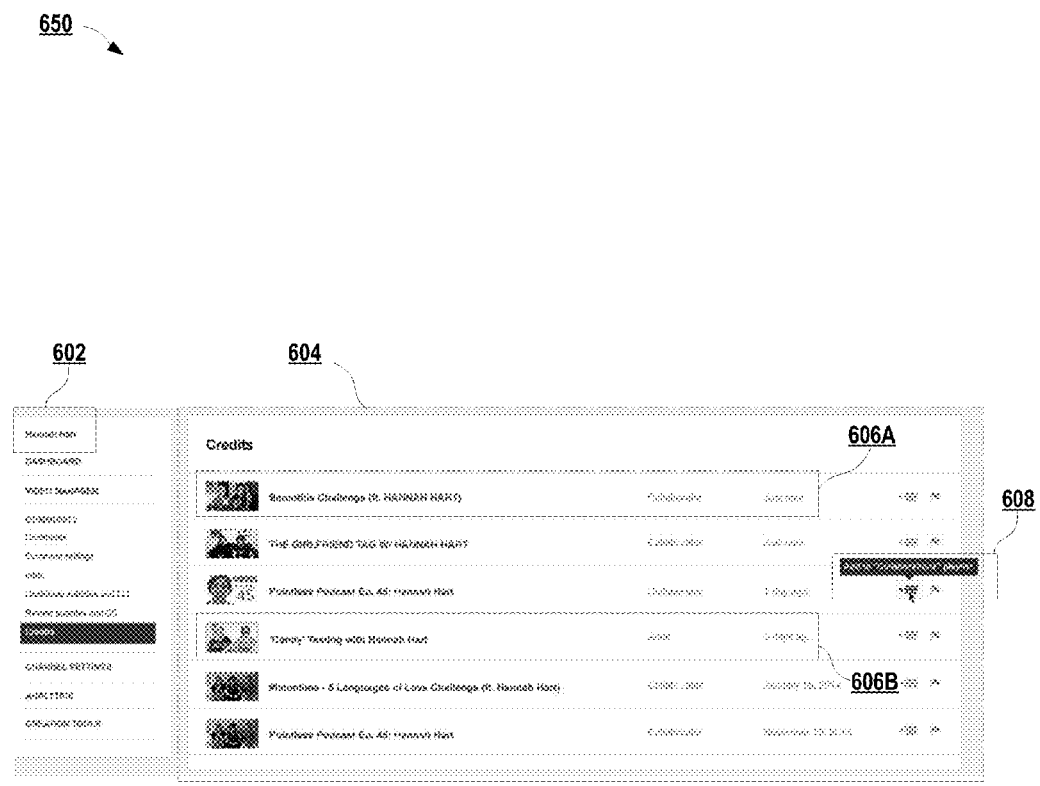
FIG. 6 illustrates an example user interface (UI) 650 for displaying the credits of an entity, in accordance with some aspects of the present disclosure.

FIG. 6 illustrates an example user interface (UI) 650 for displaying credit data associated with a specific entity. Interface 650 includes entity area 602 and credits area 604. Each of one of the media items 606A-B in media item area 604 may be associated with credit data that includes metadata correlating to the same entity but with a variety of roles and/or media items. As shown here, entity area 602 displays entity "Hannah Hart" and credit area 604 displays the media items that Hannah Hart contributed to. For example, in media item 606A titled "Smoothie Challenge," Hannah Hart contributed to the media item in the role of "Collaborator." In media item 606B titled "Candy Testing with Hannah Hart," she performed the role of Actor.

Interface 650 also includes feature 608, which allows an entity to add a specific media item to a playlist of collaborations. The playlist is a list of media items that are automatically (without any user interaction) played one after another unless specifically interrupted by the user (e.g., by selecting a particular item from the list or by causing the playback of the items in the playlist to stop).

Figure 7:
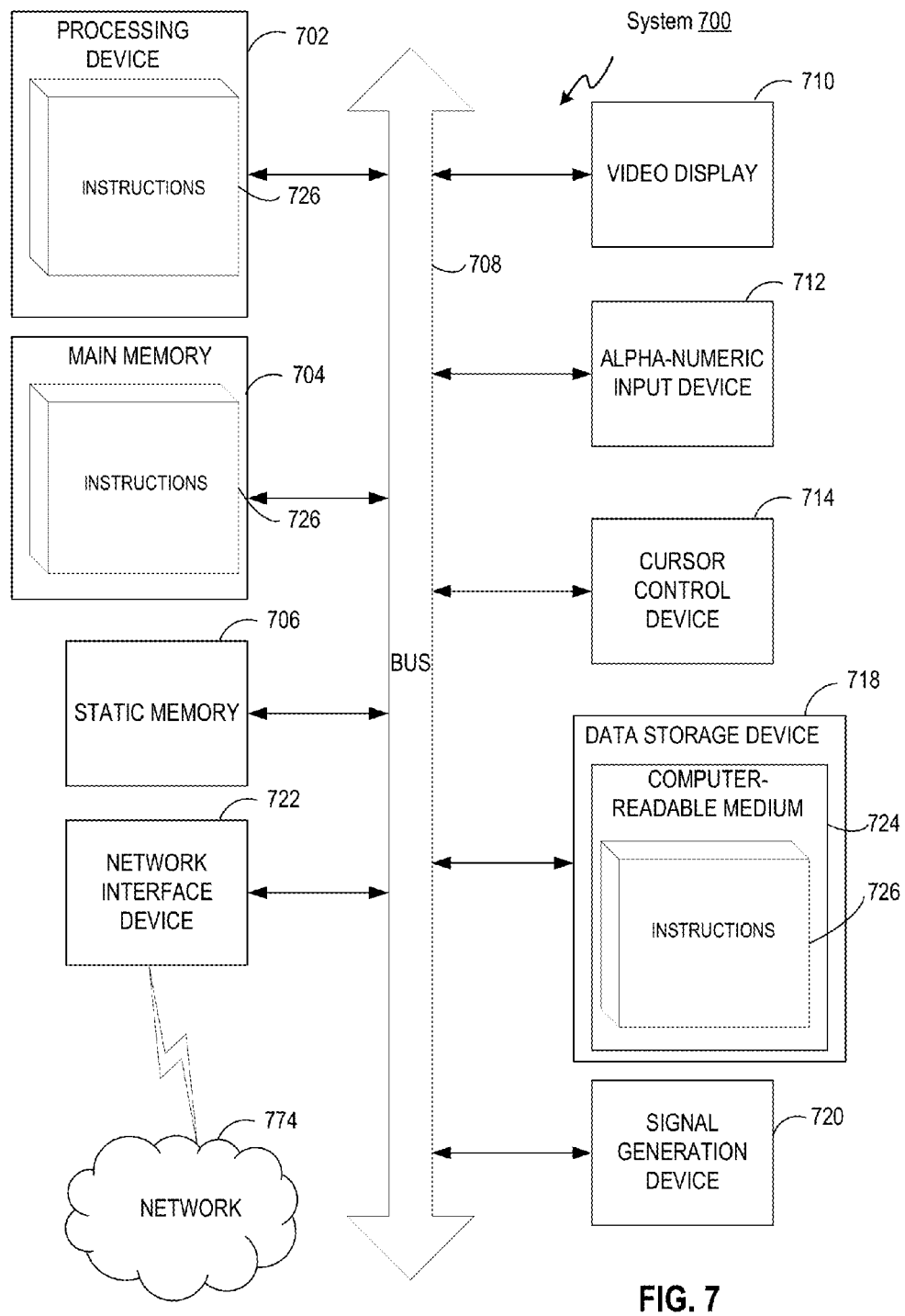
FIG. 7 is a block diagram illustrating an exemplary system architecture, according to some embodiments.

FIG. 7 illustrates a diagrammatic representation of a machine in the exemplary form of a computer system 700 within which a set of instructions or sets of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like, having one or more cores. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein. For example, the processor 702 may execute instructions 726 to perform method 300 as shown herein in FIG. 3.

The computer system 700 may further include a network interface device 722. The computer system 700 also may include a video display unit 710 (e.g., a liquid crystal display (LCD), a cathode ray tube (CRT), or a touch screen), an alphanumeric input device 712 (e.g., a physical keyboard or a virtual keyboard), a cursor control device 714 (e.g., a mouse), and a signal generation device 720 (e.g., a speaker).

The data storage device 718 may include a non-transitory computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 via the network interface device 722.

In one embodiment, the instructions 726 include instructions for providing a media item storage, an identification module 232, notification module 234, verification module 236, aggregating module 252 and display formatting module or other features which may correspond, respectively, to identically-named counterparts described with respect to FIGS. 1, 2, and 3, and/or a software library containing methods for displaying content in between loops of a looping media item. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "monitoring", "determining", "receiving", "identifying", "generating", "maintaining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to a system for performing the operations herein. This system may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Reference throughout this specification to "one embodiment" or "an embodiment" means that a particular feature, structure, or characteristic described in connection with the embodiment is included in at least one embodiment. Thus, the appearances of the phrase "in some embodiments" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device, credit data associated with a media item, the credit data identifying an entity contributing to the media item and a role of the entity;
   transmitting, by the processing device, a notification to the entity identified by the credit data;
   receiving, by the processing device, a verification of the contribution of the entity and the role of the entity in response to the notification; and
   providing for presentation, by the processing device, the media item and a set of entities contributing to the media item as defined by the credit data, wherein the set comprises the entity.

2. The method of claim 1, further comprising storing the credit data in a data store.

3. The method of claim 1, further comprising:
   creating a record comprising the credit data in a data store.

4. The method of claim 1, wherein the media item comprises a video content and the entities comprise users within the video content.

5. The method of claim 1, further comprising:
   receiving a user selection of the entity from the set of entities; and
   providing for presentation a set of media items that the entity has contributed to.

6. The method of claim 5, wherein providing for presentation the set of media items that the entity has contributed to comprises listing media items associated with the role of the entity without providing media items associated with a different role of the entity.

7. The method of claim 5, wherein providing for presentation the set of media items that the entity has contributed to comprises providing for display a list of media items associated with a user specified combination of multiple entities.

8. The method of claim 1, wherein the set of entities contributing to the media item comprises any one of the following, an actor, a producer, a director, a writer or a financial contributor.

9. The method of claim 1, wherein providing for presentation the media item comprises causing the credit data to be presented next to the media item, wherein upon a user selection of the credit data, a profile of a corresponding entity is to be displayed.

10. The method of claim 3, further comprising:
    adding the media item to a content library of the entity, wherein the entity is not an uploader of the media item; and
    causing the media item to be featured on at least one of a channel user interface associated with the entity or a profile user interface associated with the entity.

11. A system comprising:
    a memory storing instructions thereon; and
    a processing device communicably coupled to the memory, the processing device executing instructions to:
       receive credit data associated with a media item, the credit data identifying an entity that contributed to the media item and a role of the entity;
       transmitting a notification to the entity identified by the credit data;
       receive a verification of the contribution of the entity and the role of the entity in response to the notification; and
       provide for presentation the media item and a set of entities contributing to the media item as defined by the credit data, wherein the set comprises the entity.

12. The system of claim 11, wherein the processing device is to:
    create a record comprising the credit data in a data store.

13. The system of claim 11, wherein the media item comprises a video content and the entities comprise users within the video content.

14. The system of claim 12, wherein providing for presentation the set of media items that the entity has contributed to comprises providing for display a list of media items associated with the role of the entity without providing media items associated with a different role of the entity.

15. The system of claim 12, wherein providing for presentation the set of media items that the entity has contributed to comprises providing for display a list of media items associated with a user specified combination of multiple entities.

16. The system of claim 11, wherein the set of entities contributing to the media item comprises any one of the following, an actor, a producer, a director, a writer or a financial contributor.

17. The system of claim 11, wherein providing for presentation the media item comprises causing the credit data to be presented next to the media item, wherein upon a user selection of the credit data, a profile of a corresponding entity is to be displayed.

18. The system of claim 12, further comprising:
    adding the media item to a content library of the entity, wherein the entity is not an uploader of the media item; and
    causing the media item to be featured on at least one of a channel user interface associated with the entity or a profile user interface associated with the entity.

19. A non-transitory computer readable storage medium comprising data that, when executed by a processing device cause the processing device to perform operations comprising:
- receiving credit data associated with a media item, the credit data identifying an entity contributing to the media item and a role of the entity;
- transmitting a notification to the entity identified by the credit data;
- receiving a verification of the contribution of the entity and the role of the entity in response to the notification; and
- providing for presentation the media item and a set of entities contributing to the media item as defined by the credit data, wherein the set comprises the entity.

20. The non-transitory computer readable storage medium of claim 19, further comprising:
- creating a record in the data store.

* * * * *